Dec. 28, 1937.  A. JACKSON  2,103,674
STEERING GEAR LOCK FOR MOTOR VEHICLES
Filed June 16, 1936
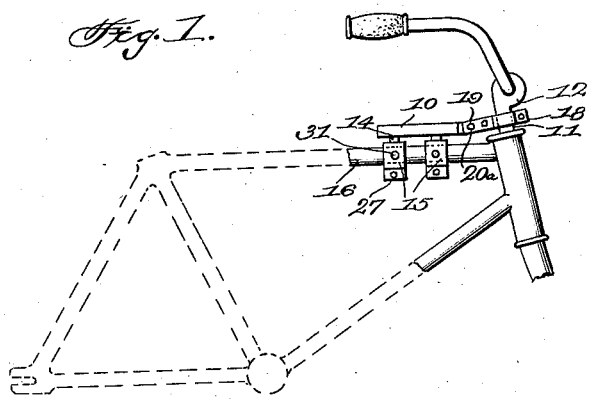
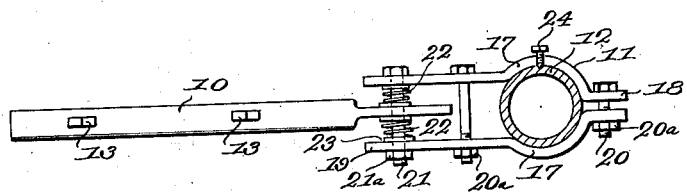
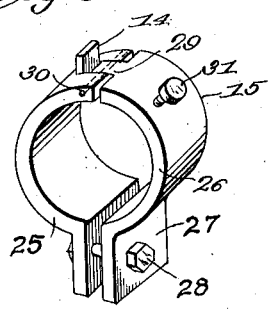
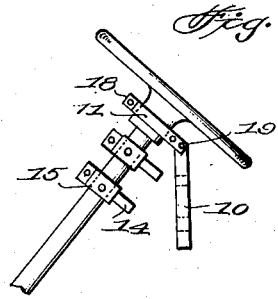
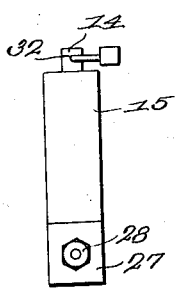
Inventor
A. Jackson
Horace C. Chandlee
By
Attorney Patented Dec. 28, 1937

2,103,674

UNITED STATES PATENT OFFICE 2,103,674

STEERING GEAR LOCK FOR MOTOR VEHICLES

Andrew Jackson, Memphis, Tenn.

Application June 16, 1936, Serial No. 85,579

1 Claim. (Cl. 280—272)

This invention relates to locks for the steering mechanism of motor cycles, automobiles, and the like, and the object is to provide a lock of this type which will be simple of construction so that it may be manufactured at a less cost but which will, at the same time, be durable and easily manipulated.

Primarily, the invention includes a locking lever to be attached to a movable part of the steering mechanism, and means for securely holding said lever against lateral movement, which said means is adapted for attachment to a stationary part of the vehicle.

In the drawing, Figure 1 is a side elevation of a portion of the frame and steering mechanism of a motor cycle showing the invention applied thereto, in operative position, Figure 2 is a plan view of that portion of the invention to be applied to the movable part of the steering mechanism, Figure 3 is a perspective view of one of two like elements forming that portion adapted to be connected to a stationary part of the vehicle, Figure 4 is a view of a portion of the steering mechanism of an automobile showing the invention applied thereto, in inoperative position, and Figure 5 is a detail illustrating a modification.

Referring to the drawing, and particularly to Figure 1 thereof, the invention includes a lever 10 pivotally connected, for vertical movement, to a clamp 11 by means of which it is attached to the steering column 12 of a motor cycle, the lever having a series of vertical perforations 13 therethrough, preferably two in number. These perforations, when the lever 10 is in lowered position, receive upstanding lugs 14, each of which is carried by a clamp 15 engaged around and rigidly secured to the top bar 16 of the frame vehicle. It will be noted that when the parts are in the position just described, the steering column 12 is locked against movement.

As shown in Figure 2, the clamp 11, by means of which lever 10 is attached, includes two correspondingly formed arcuate jaws 17 the extremities of which are offset to form ears 18 and 19, the latter being somewhat longer than the former. Bolts 20, having nuts 20a threaded thereon pass through the ears 18 and 19 for clamping the jaws 17 to the steering column 12.

One end of the lever 10 is positioned between the outer ends of the ears 19, and passing through these ends, also through the adjacent end of the lever, is a pivot bolt 21 having a nut 21a for holding the same in place. The end of the lever 10 is spaced from the ears 19, and at opposite sides of said lever end are coil springs 22 each of which surrounds the bolt 21 and bears, at one end, against the inner face of an ear 19, and at the other end against one of a pair of washers 23 which are mounted on the bolt 21 and rest against the adjacent end of the lever 10. Because of the springs 22 the washers 23 exert sufficient friction against the lever to cause it to remain in raised position when the device is out of use. One of the jaws 17 has a set screw 24 threaded therethrough for engagement with the steering column 12 to prevent rotation of the clamp.

As shown in Figure 3, each of the clamps 15, of which there are preferably two, includes two arcuate jaw members 25 and 26, which are hinged together at one end and which have their free ends offset to form ears 27 through which is a bolt 28 for clamping the jaws to the bar 16. The hinged end of the jaw 25 is bifurcated and that portion between the furcations is struck up to form the lug 14, which is received within one of the openings 13 of the lever 10. The corresponding end of the jaw 26 is cut away at opposite sides and the resultant finger 29 is positioned between the furcations, a pivot pin 30 being then passed through the finger and furcations, to form the hinge joint. A set screw 31 is threaded through the jaw 25 to prevent rotation of the parts on the bar 16, as will be readily understood.

If desired, one of the lugs 14 may be perforated as shown at 32 in Figure 5, so that a padlock may be secured thereto, to prevent raising the lever 10, when the vehicle is to be left unattended.

When the device is used in connection with the steering gear of an automobile, the clamp 11 is secured to the hub of the steering wheel, immediately below said wheel, and the clamps 15 are engaged around the stationary steering column, as shown in Figure 4.

What is claimed is:

A steering gear lock for motor vehicles comprising a member adapted for attachment to a stationary part of the vehicle and a member adapted for attachment to a movable part of the steering gear, said latter member comprising jaws adapted to surround said movable part, spaced ears on said jaws, a perforated lever having an end positioned between said ears, a pivot connecting said ears and passing through said lever end, means on said first named member adapted for engagement within a perforation of said lever, washers surrounding said pivot at opposite sides of said lever, springs surrounding said pivot between said ears and said washers for urging the latter against the lever, and a clamping bolt passing through said ears between said lever and said jaws.

ANDREW JACKSON.